United States Patent Office 2,726,675
Patented Dec. 13, 1955

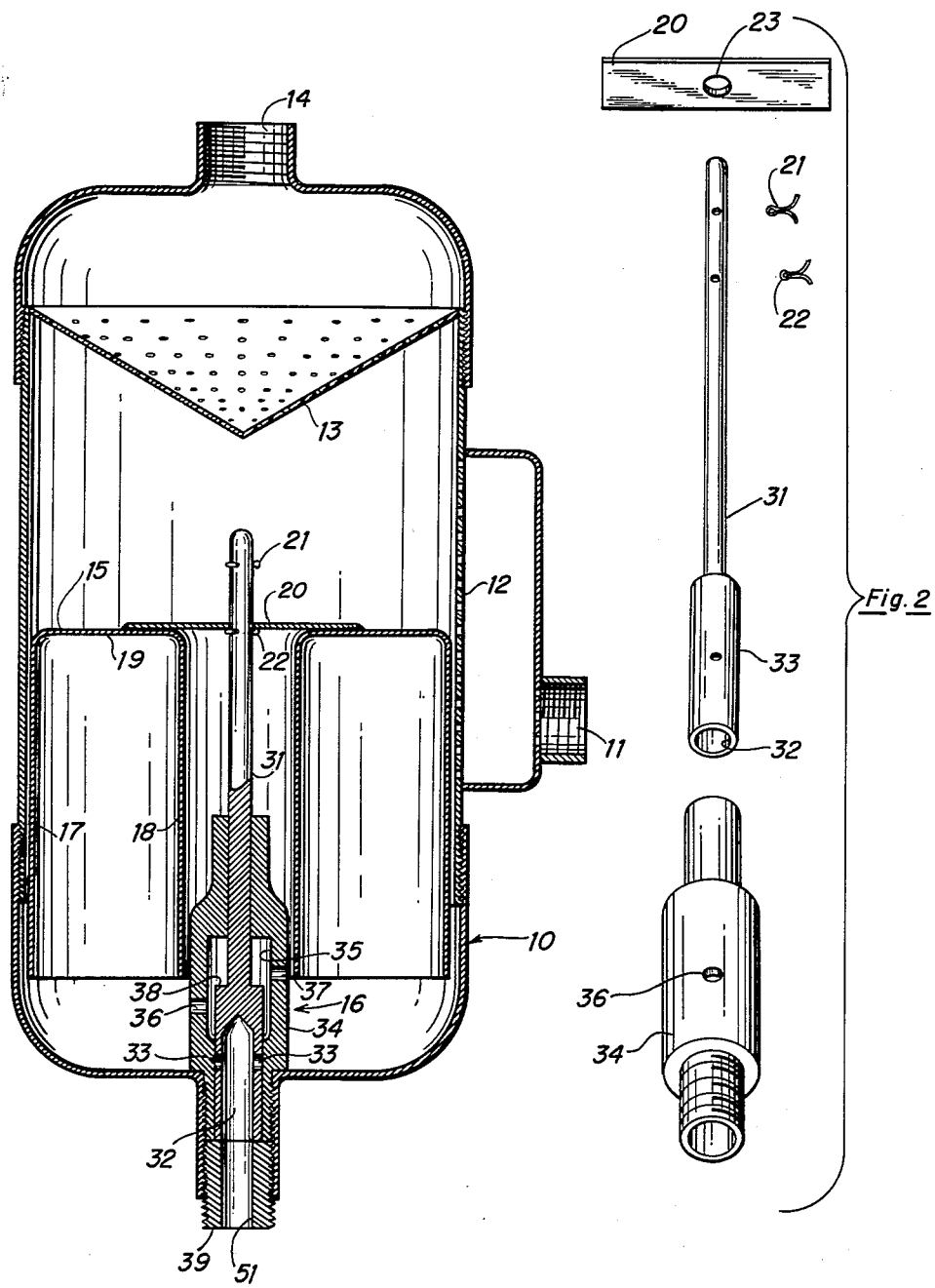

2,726,675

STEAM TRAP

Francis M. Bohler, Long Beach, Calif.

Application May 1, 1953, Serial No. 352,599

4 Claims. (Cl. 137—397)

(Granted under Title 35, U. S. Code (1952), sec. 266)

The invention described herein may be manufactured and used by or for the Government of the United States of America for governmental purposes without the payment of any royalties thereon or therefor.

This invention relates to a new and improved steam trap.

It is an object of the invention to provide a vapor-condensate trap that is efficient in operation under high pressures, such as may be present in gas or steam lines.

It is an object of the invention to provide a steam trap condensate valve which is quick-acting and does not require close tolerance of the valve plunger seat.

It is still a further object to provide a steam trap which employs an extremely efficient yet simple condensate valve construction.

Another object of the invention is to provide a gas and liquid separator which will efficiently remove condensation from compressed air and steam lines.

Still another object is the provision of a steam trap which is inexpensive and simple of construction.

Other objects and many of the attendant advantages of this invention will be readily appreciated as the same becomes better understood by reference to the following detailed description when considered in connection with the accompanying drawing wherein:

Fig. 1 is a vertical sectional elevation of an embodiment of the invention.

Fig. 2 is an exploded view of the valve assembly with ancillary connecting parts.

Referring to the figures of the drawing, gas, such as steam or air, including condensate enters reservoir 10 through inlet 11. Passing through vertical baffle plate 12 the condensate falls to the bottom of the reservoir 10 while the gas, which may be steam, air or otherwise, impinges upon and passes through upper baffle plate 13 and out through outlet 14.

The condensate accumulates in the bottom of the reservoir and is caused to escape intermittently therefrom through the coaction of a float 15 and condensate valve 16.

Float 15 is open at the bottom and essentially is formed as two concentric hollow cylinders in integral and continuous connection at their upper end. The thus formed integral outer and inner concentric walls 17 and 18 and end wall 19 form an effective air chamber, and the float 15 will rise when the condensate level comes above a predetermined water level. The construction of the float in this manner makes the same very satisfactory for use under pressure, as it is much less susceptible to collapse under pressure than most previously used floats. It will be noted that the central opening extending through the float permits condensate formed on the upper baffle plate 13 to readily drop down to the bottom of the reservoir 10. The float 15 is operatively connected to plunger 31 of condensate valve 16 through cross member 20, and a lost-motion connection in the form of a pair of spaced apart cotter pins 21, 22 in the plunger 31. Cross member 20 is secured, as by welding or other desired means, to the upper end of the float 15, and has a central aperture 23 therein through which passes the upper end of the plunger 31. This lost-motion connection 21, 22, 23 is advantageous in providing very effective control of the plunger by the float. This construction is further advantageous in its simplicity of manufacture, ease of servicing, and freedom from joint seizure, as has occurred in many types of construction in the past.

At a predetermined condensate level, float 15 rises and after taking up the slack in the lost motion connection 21, 22, 23 raises plunger 31, the lower end of which is bored, as indicated at 32, and provided with radially extending lateral ports 33. The plunger 31 thus forms a movable valve member which cooperates with stationary valve casing 34 to control the outflow of condensate through condensate outlet 51.

The stationary valve casing 34 has a central bore in which the lower end of plunger 31 slides in liquid-tight relation. This central bore is enlarged as indicated at 35 to form a chamber communicating with the interior of reservoir 10 through ports 36, 37 in casing 34. The chamber formed by the enlargement 35 of the central bore is important in insuring a fluid communication path between ports 33 and 36, 37 when the plunger is raised, in that it provides a path regardless of the angular position of plunger 31. Otherwise stated, the ports 33 may be in any angular position and a fluid communication path will be provided between them and ports 36, 37 when the plunger is in raised position. A shoulder 38 formed on plunger 31 limits upward movement of the plunger, and its downward movement may be limited by a nipple 39, threadedly secured in the bottom of reservoir casing 10. A condensate outlet line may be connected to the threaded nipple to provide for runoff of the condensate. While it is advantageous to provide two or more ports in both the plunger and the casing, it will be apparent that one port may be used in either or both of the plunger and casing as may be desired.

In operation the air, gas, steam, or other vapor, plus any condensate, enters the trap through inlet 11 and passes through baffle plate 12. The air, gas, steam, or other vapor continues up through inverted conical baffle plate 13, and that which is not condensed at this point passes out through the outlet 14. Some condensate will be formed by the impinging of the vapor upon the baffle 13 and will flow downwardly to the apex of the baffle 13 and fall through the central opening in the float 15 to the bottom of the reservoir 10. The condensate which enters the inlet 11 flows down the inner side of the reservoir 10 to the bottom thereof and, together with such condensate as may be formed by condensation in the reservoir, builds up in accumulation to the point where the condensate valve plunger 31 is raised by the buoyant raising of the float 15. The raising of the plunger 31 opens a fluid communication path between the reservoir interior and the condensate outlet 51. This path passes through ports 36, 37, enlarged bore 35, ports 33 in the plunger 31, bore 32 in the plunger, to the condensate outlet 51. This permits some of the condensate to drain out through outlet 51, thus lowering the condensate level in the reservoir and thereby lowering the float 15 and plunger 31. The condensate continues to be discharged through outlet 51 until the condensate level has lowered to the point where the ports 33 are no longer in communication with the enlarged bore 35 in the stationary valve casing 34. This opening and closing of the condensate valve is repeated as the condensate alternately builds up and diminishes in the reservoir, the actual level of the condensate in the reservoir 10 thus varying only a small amount through this continuous action. It will be apparent that in the opening and closing of the condensate discharge valve, the seating of the plunger 31 on the nipple stop 39 is not critical as has been the case with the condensate valves previously used. On the contrary the mere raising and lowering of the valve ports 33 into and out of communication with the enlarged bore chamber 35 opens and closes, respectively, the fluid communication path through the valve. It will be seen that this valve requires no grinding as has been the case with past valves, and seats itself satisfactorily in any angular position of the plunger.

Obviously many modifications and variations of the present invention are possible in the light of the above teachings. It is therefore to be understood that within the scope of the appended claims the invention may be practiced otherwise than as specifically described.

What is claimed is:

1. In a device of the character described, a reservoir having a discharge outlet, a valve for controlling said outlet, said valve comprising a stationary casing having a central bore therein and a plunger fitted in slidable liquid tight relation in said bore, a float in said reservoir, a horizontal cross member secured to said float and having an aperture therein, said plunger being slidably fitted in said aperture, stops on said plunger above and below said cross member, said stops being spaced apart a distance greater than the thickness of said cross member to thereby provide a lost-motion connection, a bore formed in said plunger, and ports in said casing and said plunger in fluid connection in one axial position of said plunger and closed off from fluid connection in an axially shifted position of said plunger, said plunger ports opening into the bore in said plunger, the bore of said plunger forming the outlet for said valve, and the ports in said casing forming the inlet for said valve.

2. In a device of the character described, a reservoir having a discharge outlet, a valve for controlling said outlet, said valve comprising a stationary casing having a central bore therein and a plunger fitted in slidable liquid tight relation in said bore, a float in said reservoir, cooperating means on said float and plunger for providing a positive lost motion driving connection between said float and plunger in both directions of float movement, a bore formed in said plunger, and ports in said casing and said plunger in fluid connection in one axial position of said plunger and closed off from fluid connection in an axially shifted position of said plunger, said plunger ports opening into the bore in said plunger, the bore of said plunger forming the outlet for said valve, and the ports in said casing forming the inlet for said valve.

3. Liquid level control apparatus comprising a reservoir having a discharge outlet, vertically movable valve means for opening and closing said outlet, a float in said reservoir, lost motion connection means between said float and said valve means for driving said valve means to closed and open position in response to movement of said float from a pair of predetermined liquid levels, whereby the vertical movement of said valve means is substantially less than the float movement and the distance between said liquid levels.

4. The apparatus of claim 3 wherein said connecting means comprises guide means in said float slidably receiving a portion of said valve means, and a pair of abutment members carried by said valve means portion on opposite sides of said guide means.

References Cited in the file of this patent

UNITED STATES PATENTS

| | | |
|---|---|---|
| 1,422,444 | Howland | July 11, 1922 |
| 1,529,334 | Winkeller | Mar. 10, 1925 |
| 1,799,684 | Gilbert et al. | Apr. 7, 1931 |
| 2,007,358 | Anger | July 9, 1935 |
| 2,614,576 | Taylor | Oct. 21, 1952 |

FOREIGN PATENTS

| | | |
|---|---|---|
| 214,241 | Switzerland | Oct. 1, 1941 |